US010412701B2

(12) United States Patent
Wu et al.

(10) Patent No.: US 10,412,701 B2
(45) Date of Patent: Sep. 10, 2019

(54) INDOOR POSITIONING METHOD AND SYSTEM BASED ON WIRELESS RECEIVER AND CAMERA

(71) Applicant: SHENZHEN UNIVERSITY, Guangdong (CN)

(72) Inventors: Kaishun Wu, Guangdong (CN); Jun Xu, Guangdong (CN); Lu Wang, Guangdong (CN); Yongpan Zou, Guangdong (CN)

(73) Assignee: SHENZHEN UNIVERSITY, Guangdong (CN)

(*) Notice: Subject to any disclaimer, the term of this patent is extended or adjusted under 35 U.S.C. 154(b) by 0 days.

(21) Appl. No.: 15/760,230

(22) PCT Filed: May 16, 2017

(86) PCT No.: PCT/CN2017/084428
§ 371 (c)(1),
(2) Date: Mar. 15, 2018

(87) PCT Pub. No.: WO2018/133265
PCT Pub. Date: Jul. 26, 2018

(65) Prior Publication Data
US 2019/0059070 A1 Feb. 21, 2019

(30) Foreign Application Priority Data
Jan. 18, 2017 (CN) .......................... 2017 1 0035132

(51) Int. Cl.
H04W 64/00 (2009.01)
G01S 5/02 (2010.01)
(Continued)

(52) U.S. Cl.
CPC ........... *H04W 64/006* (2013.01); *G01S 3/043* (2013.01); *G01S 3/74* (2013.01); *G01S 5/0257* (2013.01);
(Continued)

(58) Field of Classification Search
CPC combination set(s) only.
See application file for complete search history.

(56) References Cited

U.S. PATENT DOCUMENTS 9,810,764 B2 * 11/2017 Shaw .................. H04W 64/006
9,955,319 B2 * 4/2018 Matus ................. B60R 21/0132
(Continued)

FOREIGN PATENT DOCUMENTS

CN 101727662 6/2010
CN 104812061 7/2015
(Continued)

OTHER PUBLICATIONS

Sen et al, "Avoiding Multipath to Revive Inbuilding WiFi Localization," Proceeding of the eleventh International conference on Mobile Systems, Applications, and Services, Jun. 26, 2013, pp. 249-262.

Primary Examiner — Magdi Elhag
(74) Attorney, Agent, or Firm — JCIPRNET

(57) ABSTRACT

The invention provides an indoor positioning method and system based on a wireless receiver and a camera, belonging to the field of positioning technology. The method in the invention comprises the following steps: a wireless receiver detects a query WIFI signal transmitted by a target device and extracts a MAC address and CSI of the target device from a query WIFI signal; a server captures the MAC address and the CSI of the target device from the wireless receiver, calculates an incident angle of the target device and the wireless receiver and sends a photographing instruction to a camera which photographs an image and uploads the image to the server; the server obtains the distance between the wireless receiver and the target device through the image (Continued)

pixels, and calculates the position information of the target device according to the coordinates of the wireless receiver. The invention realizes the accurate positioning of the target device by using only a wireless receiver and a camera, so that the cost can be controlled and a real-time calculation can be ensured; the combination of the two beneficial effects can help achieve good positioning results.

9 Claims, 2 Drawing Sheets

(51) Int. Cl.
| | |
|---|---|
| *H04W 4/33* | (2018.01) |
| *H04N 5/232* | (2006.01) |
| *H04B 7/06* | (2006.01) |
| *H04W 4/02* | (2018.01) |
| *G01S 3/04* | (2006.01) |
| *G01S 3/74* | (2006.01) |
| *G01S 5/12* | (2006.01) |
| *H04W 84/12* | (2009.01) |

(52) U.S. Cl.
CPC ............. *G01S 5/12* (2013.01); *H04B 7/0626* (2013.01); *H04N 5/23206* (2013.01); *H04W 4/023* (2013.01); *H04W 4/33* (2018.02); *H04W 84/12* (2013.01)

(56) References Cited

U.S. PATENT DOCUMENTS

| | | | |
|---|---|---|---|
| 10,071,892 B2* | 9/2018 | High | E01H 5/12 |
| 10,171,943 B1* | 1/2019 | Rouphael | H04W 4/025 |
| 10,178,510 B1* | 1/2019 | Kai | H04M 1/7253 |
| 2014/0128032 A1* | 5/2014 | Muthukumar | H01Q 3/00 |
| | | | 455/411 |
| 2015/0042812 A1* | 2/2015 | Tang | H04N 5/23206 |
| | | | 348/157 |
| 2015/0094089 A1* | 4/2015 | Moeglein | H04W 4/029 |
| | | | 455/456.1 |
| 2015/0247912 A1* | 9/2015 | Tang | G01S 3/7864 |
| | | | 348/169 |
| 2015/0350614 A1* | 12/2015 | Meier | H04N 7/188 |
| | | | 348/144 |
| 2017/0029107 A1* | 2/2017 | Emami | B64C 39/024 |
| 2017/0332201 A1* | 11/2017 | Zhang | H04L 5/1438 |
| 2018/0356492 A1* | 12/2018 | Hamilton | G01S 13/76 |

FOREIGN PATENT DOCUMENTS

| | | |
|---|---|---|
| CN | 105629199 | 6/2016 |
| CN | 205718999 | 11/2016 |
| CN | 106231670 | 12/2016 |
| WO | 2016122761 | 8/2016 |

* cited by examiner

INDOOR POSITIONING METHOD AND SYSTEM BASED ON WIRELESS RECEIVER AND CAMERA

CROSS-REFERENCE TO RELATED APPLICATION

This application is a 371 application of the international PCT application serial no. PCT/CN2017/084428, filed on May 16, 2017, which claims the priority benefit of China application no. 201710035132.1, filed on Jan. 18, 2017. The entirety of each of the abovementioned patent applications is hereby incorporated by reference herein and made a part of this specification.

BACKGROUND OF THE INVENTION

Technical Field

The invention relates to the field of positioning technology, and more particularly, to an indoor positioning method based on a wireless receiver and a camera, and further relates to a system for implementing the indoor positioning method.

Description of Related Art

With the progress of the times and the development of science and technology, the demand for indoor positioning is increasing. It not only facilitates people's daily travel, but also helps the government to carry out more effective social governance. Although there are many technologies that can be used for indoor positioning, such as ultrasonic, ultra-wideband, infrared, radio frequency tags and Bluetooth beacons, WIFI is undoubtedly one of the most appropriate choices, considering the difficulty of infrastructure installation, maintenance cost and positioning accuracy.

The existing indoor positioning technology based on WIFI can be roughly divided into two types; one is based on the fingerprint database, and the other is based on the scene real-time calculation. The fingerprint database-based method not only requires a complicated fingerprint extraction process, but also is easily affected by the change of the surrounding environment, so it cannot be widely popularized in practice. Currently, the scene real-time computing methods may require multiple wireless receivers to work together, or need to change the firmware of wireless receivers to make them work in a special way, or need to use proprietary chips to calculate the time of flight; as is clear from the above, the methods either result in a greater cost of use and a difficulty in installation or are limited by the problem of the proprietary hardware that cannot be duplicated with the existing facilities. How to maximize the use of the existing facilities while minimizing the costs of use and maintenance is key to the feasibility of an indoor positioning technology.

BRIEF SUMMARY OF THE INVENTION

In order to solve the problems in the prior art, the invention provides an indoor positioning method based on a wireless receiver and a camera, and further provides a system for implementing the indoor positioning method.

The indoor positioning method based on a wireless receiver and a camera comprises the following steps:

S1: the wireless receiver detects a query WIFI signal transmitted by a target device;

S2: the wireless receiver extracts a media access control (MAC) address and channel state information (CSI) used for uniquely identifying a target device from a query WIFI signal, and uploads the CSI to a server;

S3: the server calculates an incident angle of the target device and the wireless receiver according to the CSI uploaded by the wireless receiver, and at the same time sends a photographing instruction to the camera which photographs an image and uploads the image to the server;

S4: the server obtains the distance between the wireless receiver and the target device through the image pixels, and calculates the position information of the target device according to the position of the wireless receiver.

As a further improvement of the invention, the number of the wireless receiver and the camera is one respectively.

As a further improvement of the invention, in Step S1, the target device comprises a smart phone, and the positioning of the target population is completed according to the target population carrying the smart phone.

As a further improvement of the invention, in Step S1, the wireless receiver comprises a WIFI probe, a WIFI wireless listener and a wireless receiver.

As a further improvement of the invention, in Step S2, the CSI extraction method comprises:

S21: the channel state data are collected, wherein the initial channel state data comprise the channel state data values of M subcarriers in N spatial streams, both N and M being natural numbers greater than 1;

S22: for each spatial stream, an average value of the channel state data values of P consecutive subcarriers at a same time point is obtained and used as the CSI value, P being a natural number greater than 1 and less than M;

S23: the CSI value is modified by using the least square best fit algorithm.

As a further improvement of the invention, in Step S3, the method for calculating the incident angle of the target device to the wireless receiver on the server side is as follows:

S31: the eigenvalue and eigenvector factorization is performed for the CSI matrix contained in the acquired data packet;

S32: a basis function of a multi-signal classification algorithm is constructed by using the eigenvalue;

S33: the incident angle $\theta$ in the range of 0 to 360 degrees is scanned by using a basis function, and the flight time $\tau$ in the range of 1 to 20 nanoseconds is scanned; for each pair of independent variables ($\theta$, $\tau$), when the dependent variable of the base function has a peak, the actual incident path corresponding to the independent variable is obtained;

S34: the smallest independent variable of $\tau$ is detached, and the corresponding $\theta$ value in the independent variable is the incident angle $\theta$ of the target device to the wireless receiver.

As a further improvement of the invention, in Step S4, a method for calculating the distance between the target device and the wireless receiver is as follows:

S41: the corresponding relationship between the distance and the pixels in the image is calculated according to the known wireless receiver and camera positions;

S42: the wireless receiver is taken as a starting point and a human search algorithm is performed along an angle $\theta$ to identify the position of a human body, that is, the position of a target;

S43: the actual distance between the target and wireless receiver is calculated according to the pixels of the human body and the wireless receiver.

The invention further provides a system for implementing the indoor positioning method, characterized in that, comprising: a target device for sending a query WIFI signal; a wireless receiver for detecting a query WIFI signal transmitted by a target device and extracting a MAC address and CSI from a query WIFI signal; a camera for photographing an indoor image and uploading the image to a server; a server for calculating an incident angle of a target device and a wireless receiver and sending a photographing instruction to a camera; and the distance between the wireless receiver and the target device is obtained through the image pixels, and the position information of the target device is calculated according to the position of the wireless receiver.

As a further improvement of the invention, the number of the wireless receiver and the camera are respectively one.

As a further improvement of the invention, the target device comprises a smart phone, and the positioning of the target population is completed according to the target population carrying the smart phone; the wireless receiver comprises a WIFI probe, a WIFI wireless listener and a wireless receiver.

Compared to the prior art, the invention has the following beneficial effects: The invention realizes the accurate positioning of the target device by using only one wireless receiver and more closely matches the normal application scene of the WIFI; meanwhile, with a widely used camera, supplemented by a simple computer image processing algorithm, the cost can be controlled and a real-time calculation can be ensured; the combination of the two beneficial effects can help achieve good positioning results.

DETAILED DESCRIPTION OF THE INVENTION

The invention is further detailed in combination with the drawings and embodiments as follows.

Figure 1:
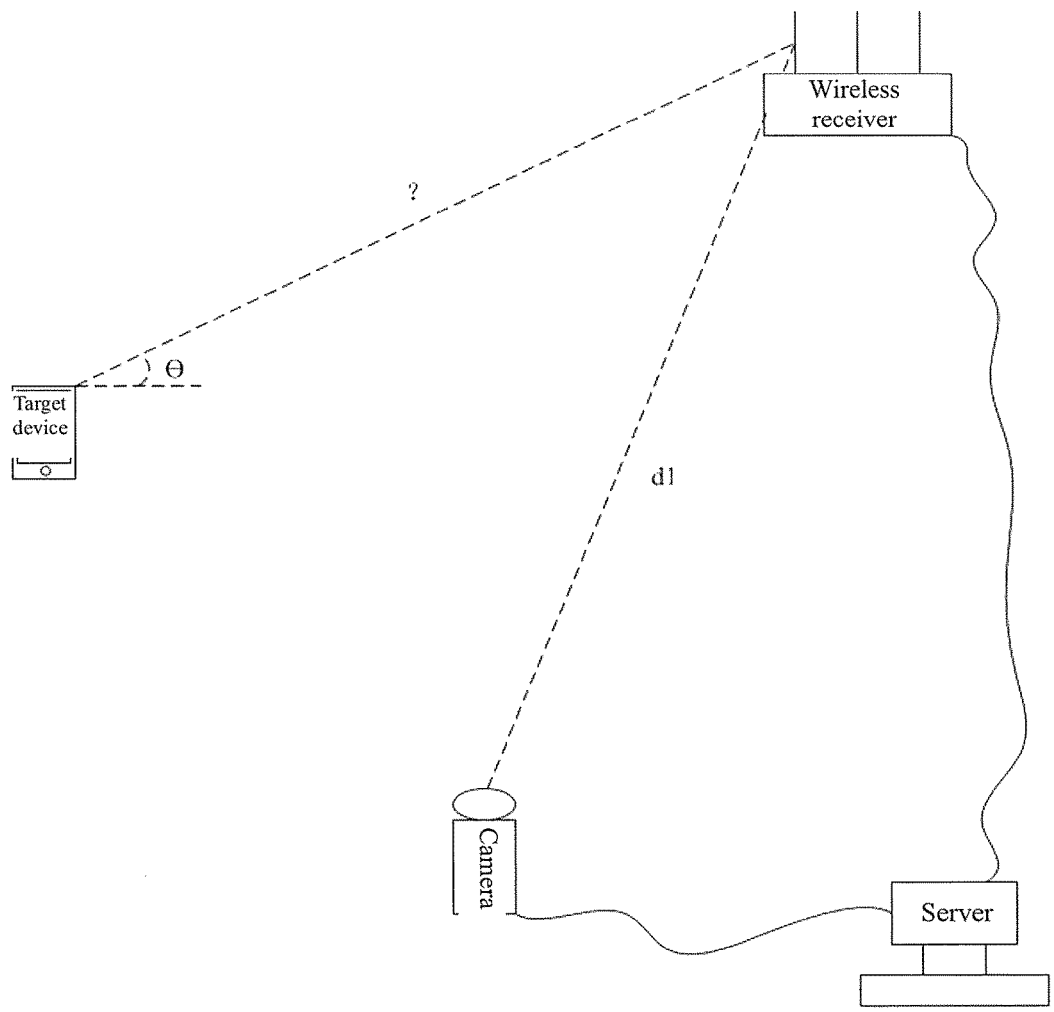
FIG. 1 is a structural diagram of the invention.

As shown in FIG. 1, the system for implementing the indoor positioning method of the invention, comprising: a target device for sending a query WIFI signal; a wireless receiver for detecting a query WIFI signal transmitted by a target device and extracting a MAC address and CSI from a query WIFI signal; a camera for photographing an indoor image and uploading the image to a server; a server for calculating an incident angle of a target device and a wireless receiver and sending a photographing instruction to a camera; and the distance between the wireless receiver and the target device is obtained through the image pixels, and the position information of the target device is calculated according to the position of the wireless receiver.

The number of the wireless receiver and the camera is one respectively. The target device comprises a smart phone, and the positioning of the target population is completed according to the target population carrying the smart phone; the wireless receiver in this embodiment may be a WIFI probe, a WIFI wireless listener or a wireless receiver, as long as the wireless receiver can obtain a query WIFI signal transmitted by the target device; the wireless receiver in this embodiment can be set on the same device along with a wireless router or be set separately in different places.

This embodiment uses a wireless listener as an example. In practice, both a camera and a wireless listener are connected to a server; the positioning algorithm is also performed on the server side, and the CSI acquisition of the wireless receiver and the image acquisition of the camera need to be synchronized.

The invention captures the query signal through a WIFI wireless listener deployed in the scene according to the characteristics that a smart phone carried by the target population regularly transmits a WIFI query signal; on one hand, a device's media access control (MAC) address is extracted through a protocol analysis software, and on the other hand, the angle between the target device and the listener is estimated according through the CSI.

According to the angle information, the camera deployed around the listener is used to image the target area; based on the known characteristics of the position of the camera and the WIFI wireless listener, the relationship between the pixels and the position is analyzed to estimate the distance between the target device and the listener.

Figure 2:
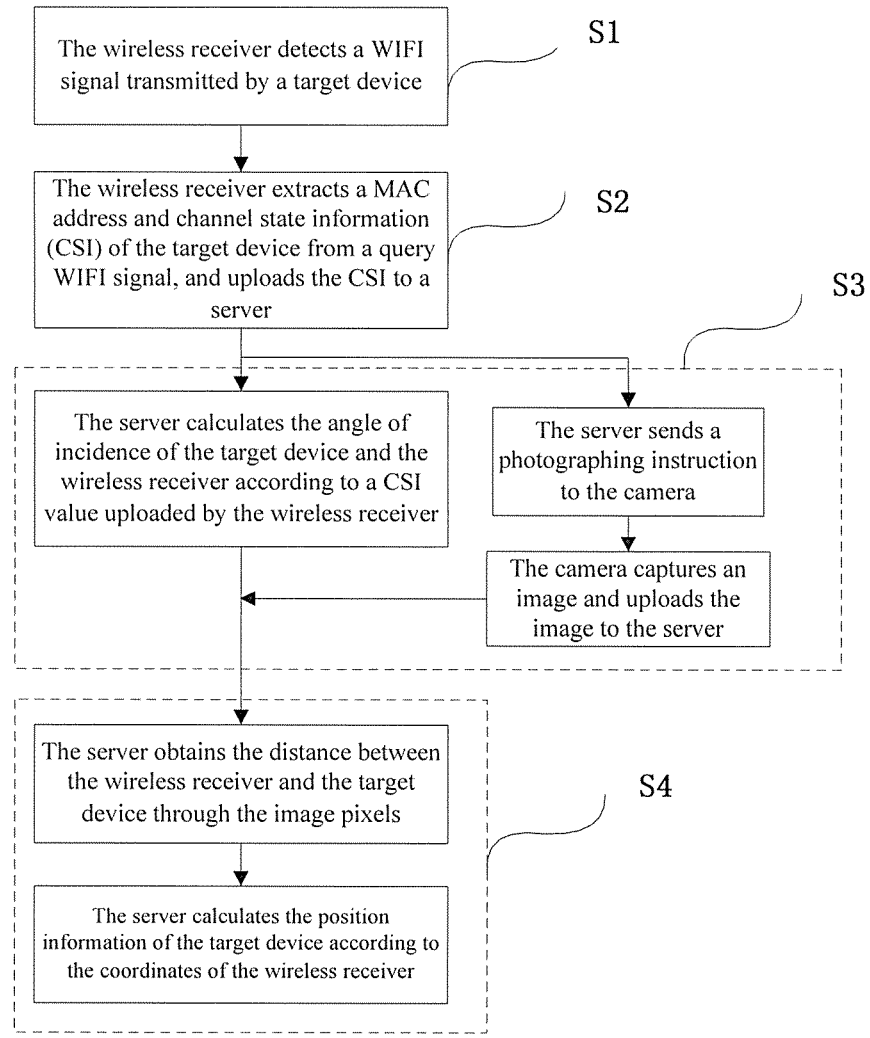
FIG. 2 is a flow chart of the method in the invention.

Specifically, as shown in FIG. 2, the indoor positioning method based on a wireless receiver and a camera in the invention comprises the following steps:

S1: the wireless receiver detects a query WIFI signal transmitted by a target device;

S2: the wireless receiver extracts a MAC address and CSI of the target device from a query WIFI signal;

S3: the server captures a MAC address and a CSI value of the target device from the wireless receiver, calculates the incident angle of the target device and the wireless receiver, and sends a photographing instruction to the camera which photographs an image and uploads the image to the server;

S4: the server obtains the distance between the wireless receiver and the target device through the image pixels, and calculates the position information of the target device according to the position of the wireless receiver;

wherein in Step S2, the CSI extraction method comprises:
S21: the channel state data are collected, wherein the initial channel state data comprise the channel state data values of M subcarriers in N spatial streams, both N and M being natural numbers greater than 1;

S22: for each spatial stream, an average value of the channel state data values of P consecutive subcarriers at a same time point is obtained and used as the CSI value, P being a natural number greater than 1 and less than M;

S23: the CSI value is modified by using the least square best fit algorithm.

The 802.11n-based wireless signal transmission physical layer protocol mainly uses the Orthogonal Frequency Division Multiplex (OFDM) technology and the Multiple-Input Multiple-Output (MIMO) technology. In order to realize the reliable transmission of signals, the agreement stipulates that the CSI, that is, the transmission state of each frequency of subcarriers on each channel, including the amplitude and phase information, needs to be evaluated. Due to the use of the MIMO technology, when the antennas are arranged in an array at intervals, the CSI between adjacent antennas will differ in phase by a value of $d*f*\cos\theta$, wherein d is the distance between adjacent antennas and f is the frequency of subcarriers, $\theta$ is the angle between a wireless signal transmitted by a target device and the antennas, so the value of $\theta$ can be calculated via the CSI values of different antennas. However, on the one hand, due to the difference between the hardware devices at the transmitting end and the receiving end, the subcarrier frequency and the sampling time are not completely consistent between the transmitting end and the receiving end, and there is a large offset including an SFO (Sub-Carrier Frequency Offset, Subcarrier Frequency Offset) and STO (Sampling Time Offset); on the other hand, due to the multipath effect caused by the omnidirectional transmission of wireless signals, multiple incident angles are detected at the receiving end, and only the light-of-sight path (LOS) can be used for positioning. Therefore, the method in the invention mainly solves the noise problem introduced by SFO and STO and the problem of the separation of LOS paths.

This embodiment uses the least square method to find the best linear fit for different subcarriers, and then uses this value to correct the directly derived CSI. The specific method is as follows: the function $\psi$ (m, n)+2*pi*f((n−1)*x+y is constructed by using the characteristics that SFO and STO are constant between different subcarriers at the fixed transmitting end and the receiving end device, wherein $\psi$ (m, n) represents the phase information obtained from the CSI, m and n represent the number of antennas and subcarriers respectively, pi represents the ratio of the circumference of a circle to its diameter, f is the interval of subcarrier frequency, x and y represent the desired SFO and STO; this function is used to construct the summation formula of traversing all subcarriers and all antennas; in this formula, the derivatives of x and y are respectively taken as 0 respectively, so an equation with two unknown variables can be obtained, and x and y can be obtained via a simultaneous equation separately; and the resulting x is used to correct the CSI.

In Step S3, the invention mainly comprises a method for calculating the incident angle of the wireless signal by using an antenna array to calculate the incident angle of the target device to the wireless receiver; the calculation method is as follows:

S31: the eigenvalue and eigenvector factorization is performed for the CSI matrix contained in the acquired data packet; specifically, the CSI matrix with modified SFO and STO is converted to construct a smoothing matrix X in the following form:

$$\begin{bmatrix} csi_{1,1} & csi_{1,2} & \cdots & csi_{1,16} & csi_{2,1} & \cdots & csi_{2,16} \\ csi_{1,2} & csi_{1,2} & \cdots & csi_{1,17} & csi_{2,2} & \cdots & csi_{2,17} \\ \vdots & \vdots & \vdots & \vdots & \vdots & \vdots & \vdots \\ csi_{1,15} & csi_{1,16} & \cdots & csi_{1,30} & csi_{2,15} & \cdots & csi_{2,30} \\ csi_{2,1} & csi_{2,2} & \cdots & csi_{2,16} & csi_{3,1} & \cdots & csi_{3,16} \\ csi_{2,2} & csi_{2,3} & \cdots & csi_{2,17} & csi_{3,2} & \cdots & csi_{3,17} \\ \vdots & \vdots & \vdots & \vdots & \vdots & \vdots & \vdots \\ csi_{2,15} & csi_{2,16} & \cdots & csi_{2,30} & csi_{3,15} & \cdots & csi_{3,30} \end{bmatrix}$$

The subscript in the above matrix refers to its position in the original matrix.

S32: X is multiplied by its inverse matrix, $E_N$ denotes its column vectors, and a basis function is constructed for each column vector as follows: $1/[a(\theta,\tau)\ E_N{}^*E_N{}^H{}^*a(\theta,\tau)]$, wherein $E_N{}^H$ represents the transpose of $E_N$, and $a(\theta,\tau)$ is a vector whose value is equal to $[1, \ldots, \Omega_\tau^{N-1}, \Phi_\theta, \ldots, \Phi_\theta\Omega_\tau^{N-1}, \ldots, \Phi_\theta^{M-1}, \ldots, \Phi_\theta^{M-1}\Omega_\tau^{N-1}]$, M and N represent antenna and subcarrier numbers respectively, wherein $\Phi_\theta=\exp(-j*2*pi*d*\sin\theta*f/c)$, $\Omega_\tau=\exp(-j*2\ pi*f*\tau)$, exp represents the e-base index operation, c represents the speed of light, and the other variables are the same as before.

S33: the incident angle $\theta$ in the range of 0 to 360 degrees is scanned by using a basis function, and the flight time T in the range of 1 to 20 nanoseconds is scanned; for each pair of independent variables ($\theta$, $\tau$), when the dependent variable of the base function has a peak, the actual incident path corresponding to the independent variable is obtained;

S34: detach the smallest independent variable of $\tau$ is detached, and the corresponding $\theta$ value in the independent variable is the incident angle $\theta$ of the target device to the wireless receiver.

Since the flight time T obtained using the CSI is not accurate and the speed of light is high, directly multiplying the flight time $\tau$ and the speed of light results in a large estimated error in the distance between the target device and the reference point. Therefore, the distance between the target device and the wireless receiver needs to be calculated by other methods; the invention uses a computer technology to solve this problem.

A computer image is composed of pixels which have a certain direct correspondence with distance; although the number of pixels between objects at the same distance is inconsistent due to different focal lengths, the relationship of actual positions can be obtained adaptively as long as the distance from a reference node is known. The invention requires that the wireless listener be contained in the imaging, so the installation position of the camera needs to be coordinated with the installation position of the wireless listener.

Specifically, in Step S4, the method for calculating the distance between the target device and the wireless listener is as follows:

S41: the corresponding relationship between the distance and the pixels in the image is calculated according to the known wireless listener and camera positions. Since the wireless listener is in the image and the distance between the wireless listener and the camera is known, the relationship between the pixels and the actual distance can be calculated accordingly.

S42: the wireless listener is taken as a starting point and a human search algorithm is performed along an angle $\theta$ to identify the position of a human body, that is, the position of a target.

S43: the actual distance between the target and the wireless listener is calculated according to the pixels of the human body and the wireless receiver. Specifically, according to the relationship between the distance and the pixels obtained in Step S51, the actual distance between the target and the wireless listener can be inversely deduced through the pixels between the human body and the wireless receiver.

Since the calculations of both distance and angle are on the server side, the server is responsible for merging the calculations of distance and angle, and then records the MAC address and the converted coordinate in the database according to the media access control (MAC) information contained in the signal transmitted by the target device to complete the positioning.

The invention realizes the accurate positioning of the target device by using only one wireless receiver and more closely matches the normal application scene of the WIFI; meanwhile, with a widely used camera, supplemented by a simple computer image processing algorithm, the cost can be controlled and a real-time calculation can be ensured; the combination of the two beneficial effects can help achieve good positioning results.

The embodiment described above is a preferred embodiment of the invention, but it is not intended to limit the scope of the practical implementation of the invention. The scope of the invention includes the embodiment but is not limited to it, and all equivalent changes in accordance with the invention should be included within the scope of the invention.

What is claimed is:

1. An indoor positioning method based on a wireless receiver and a camera, comprising the following steps:
   - S1: the wireless receiver detects a query WIFI signal transmitted by a target device;
   - S2: the wireless receiver extracts a media access control (MAC) address and channel state information (CSI) used for identifying the target device from a query WIFI signal, and uploads the CSI to a server;
   - S3: the server calculates an incident angle of the target device and the wireless receiver according to the CSI uploaded by the wireless receiver, and at the same time sends a photographing instruction to the camera which photographs an image and uploads the image to the server;
   - S4: the server obtains a distance between the wireless receiver and the target device through the image pixels, and calculates the position information of the target device according to coordinates of the wireless receivers,
   wherein in Step S2, the CSI extraction method comprises:
   - S21: initial channel state data are collected, wherein the initial channel state data comprise the channel state data values of M subcarriers in N spatial streams, both N and M being natural numbers greater than 1;
   - S22: for each spatial stream, an average value of the channel state data values of P consecutive subcarriers at a same time point is obtained and used as the CSI value, P being a natural number greater than 1 and less than M;
   - S23: the CSI value is modified by using a least square best fit algorithm.

2. The indoor positioning method as claimed in claim 1, wherein the number of the wireless receiver and the camera is one respectively.

3. The indoor positioning method as claimed in claim 2, wherein in Step S1, the target device comprises a smart phone, and the positioning of a target population is completed according to the target population carrying the smart phone.

4. The indoor positioning method as claimed in claim 1, wherein in Step S1, the wireless receiver comprises a WIFI probe, a WIFI wireless listener and a wireless receiver.

5. The indoor positioning method as claimed in claim 4, wherein in Step S3, the method for calculating the incident angle of the target device to the wireless receiver on the server side is as follows:
   - S31: eigenvalue and eigenvector factorization is performed for a CSI matrix contained in an acquired data packet;
   - S32: a basis function of a multi-signal classification algorithm is constructed by using the eigenvalue;
   - S33: the incident angle $\theta$ in the range of 0 to 360 degrees is scanned by using a basis function, and a flight time $\tau$ in the range of 1 to 20 nanoseconds is scanned; for each pair of independent variables ($\theta$, $\tau$), when the dependent variable of the base function has a peak, an actual incident path corresponding to the independent variable is obtained;
   - S34: detach the smallest independent variable of $\tau$, and the corresponding $\theta$ value in the independent variable is the incident angle $\theta$ of the target device to the wireless receiver.

6. The indoor positioning method as claimed in claim 5, wherein in Step S4, a method for calculating the distance between the target device and the wireless receiver is as follows:
   - S41: the corresponding relationship between the distance and the pixels in the image is calculated according to known wireless receiver and camera positions;
   - S42: the wireless receiver is taken as a starting point and a human search algorithm is performed along the angle $\theta$ to identify the position of a human body, that is, the position of a target;
   - S43: an actual distance between the target and the wireless receiver is calculated according to the pixels of the human body and the wireless receiver.

7. A system for indoor positioning, comprising:
   a target device for sending a query WIFI signal;
   a wireless receiver for detecting a query WIFI signal transmitted by a target device and extracting a media access control (MAC) address and a channel state information (CSI) from a query WIFI signal;
   a camera for photographing an indoor image and uploading the image to a server; and
   a server for calculating an incident angle of a target device and a wireless receiver and sending a photographing instruction to a camera; and the distance between the wireless receiver and the target device is obtained through the image pixels; and the position information of the target device is calculated according to the position of the wireless receiver,
   wherein the wireless receiver is configured to:
   collect initial channel state data, wherein the initial channel state data comprise the channel state data values of M subcarriers in N spatial streams, both N and M being natural numbers greater than 1;
   obtain and use, for each spatial stream, an average value of the channel state data values of P consecutive subcarriers at a same time point as the CSI value, P being a natural number greater than 1 and less than M; and
   modify the CSI value by using a least square best fit algorithm.

8. The system as claimed in claim 7, wherein the number of the wireless receiver and the camera is one respectively.

9. The system as claimed in claim 7, wherein the target device comprises a smart phone, and the positioning of a target population is completed according to the target population carrying the smart phone; the wireless receiver comprises a WIFI probe, a WIFI wireless listener and a wireless receiver.

* * * * *